US 7,061,247 B2

(12) United States Patent
Inokuchi et al.

(10) Patent No.: US 7,061,247 B2
(45) Date of Patent: Jun. 13, 2006

(54) ELECTRIC POWER GENERATING SYSTEM FOR A VEHICLE

(75) Inventors: Takatoshi Inokuchi, Kariya (JP); Yasuhiro Takase, Kariya (JP); Hiroshi Shibata, Chita-gun (JP); Makoto Taniguchi, Kariya (JP); Atsushi Ichikawa, Toyoake (JP)

(73) Assignee: Denso Corporation, Kariya (JP)

( * ) Notice: Subject to any disclaimer, the term of this patent is extended or adjusted under 35 U.S.C. 154(b) by 144 days.

(21) Appl. No.: 10/756,295

(22) Filed: Jan. 14, 2004

(65) Prior Publication Data

US 2004/0145186 A1 Jul. 29, 2004

(30) Foreign Application Priority Data

Jan. 29, 2003 (JP) ............................. 2003-020501
Jul. 30, 2003 (JP) ............................. 2003-282699

(51) Int. Cl.
*G01N 27/416* (2006.01)
*H02J 7/00* (2006.01)

(52) U.S. Cl. ...................... 324/430; 320/104
(58) Field of Classification Search ............... 324/430; 320/123, 104; 702/63
See application file for complete search history.

(56) References Cited

U.S. PATENT DOCUMENTS

| 4,651,081 | A | 3/1987 | Nishimura et al. ......... 320/123 |
| 5,122,723 | A * | 6/1992 | Sato .......................... 320/123 |
| 5,193,067 | A * | 3/1993 | Sato et al. ................... 702/63 |
| 5,231,344 | A | 7/1993 | Marumoto et al. |
| 6,518,735 | B1 | 5/2002 | Kawaguchi et al. ........ 324/430 |
| 6,920,404 | B1 | 12/2002 | Yamanaka ................... 702/63 |

FOREIGN PATENT DOCUMENTS

| JP | A 1-129724 | 5/1989 |
| JP | A 8-266097 | 10/1996 |

* cited by examiner

*Primary Examiner*—Pia Tibbits
(74) *Attorney, Agent, or Firm*—Oliff & Berridge, PLC

(57) ABSTRACT

A power generating system for a vehicle is configured to include a power generator, a voltage control device which controls an output voltage of the power generator, a battery which is charged by output power of the power generator, and an ECU which transmits a power generation suppression signal for suppressing power generation by the power generator when a predetermined condition is satisfied toward the voltage control device. The ECU detects a state of the battery, and inhibits transmission of the power generation suppression signal when quantity of this state is below a predetermined value.

13 Claims, 9 Drawing Sheets

$Vb1 = Vbatt - i \cdot R1$ $Vb2 = Vbatt - i \cdot R2$

ELECTRIC POWER GENERATING SYSTEM FOR A VEHICLE

CROSS REFERENCE TO RELATED APPLICATION

This application relates to and incorporates herein by reference Japanese Patent Applications No. 2003-20501 filed on Jan. 29, 2003 and No. 2003-282699 filed on Jul. 30, 2003.

FIELD OF THE INVENTION

The present invention relates to an electric power generating system for a vehicle, which controls a power generating state of a power generator for charging a battery.

BACKGROUND OF THE INVENTION

In these years, due to development of downsizing technologies in a semiconductor field, it has become possible to form a large power device such as a power transistor, a free-wheeling diode and so on, and a CMOS logic circuit on one chip in a composite manner. It also has become possible to downsize overwhelmingly as compared with a conventional voltage control device of a hybrid IC type which is fabricated by disposing discrete devices on a substrate.

Such a CMOS digital IC is suitable for speeding up operational speed and stabilization of a controlled state, and is also very small in size. It therefore excels at mounting capability to a power generator and so on. However, since a logic state is unstable at the time of power-on for starting an operation, it is necessary to inevitably reset and initialize. Also, for transistors etc. which are included in such an IC, an initial minimum voltage for compensating for an operation is determined. Further, in order for each constituent circuit (e.g., a power supply circuit for generating an operational voltage which is supplied to each circuit) in a power generation control device to operate normally, it is necessary to apply a voltage with a predetermined value or above.

On the other hand, various electric loads are connected to a power system of a vehicle. Due to power-on, power-off and so on to these electric loads, there frequently occur voltage fluctuations in which an output voltage of a power generator and a terminal voltage of a battery vary. Also, computerization has been advanced in various kinds of electric loads. The latest computerized devices are in such an environment that high frequency noises tend to take place at the time of power-on and power-off.

Also, in recent days, it is determined that, by reducing power generation torque of a power generator, idling rotation of an engine is stabilized. For the purpose of improving a fuel cost and of reducing exhaust gas and so on, cooperative control for intentionally suppressing power generation is carried out by sending a power generation suppression signal from an engine control device etc. to a voltage control device as disclosed in U.S. Pat. No. 5,231,344 (JP2651030, pages 3–9, FIGS. 1–29) and JP-A-8-266097, pages 3–6, FIGS. 1–6.

In these publications, at the time of suppressing power generation, a power operation point is lowered. However, under this state, when noise, in particular, a negative surge current is overlaid or superimposed on a power cable of a battery, a voltage to be applied from the power generator to the voltage control device is further lowered, which is evidenced by the study of the present inventors and so on. As a result of this, the voltage control device temporarily enters an inoperative state along with lowering of the output voltage of the power generator, and a power control operation becomes unstable. When the output voltage of the power generator rises and the voltage control device returns again to the operative state, it is repeated from a reset operation. Therefore, a certain period of time is required until it comes back to a stable voltage control state.

It also has become clear that, in case that a capacitor is disposed in addition, particularly, in the inside of an inductive electric load, for example, in a power system of various motors etc., a resonance phenomenon occurs at the time of transition of power-on by inductance of the load and the capacitor. This resonance causes negative surge currents resulting in noise generation.

It is possible to reduce noises which are generated due to power-on etc., by for example, disposing a capacitor, a ferromagnetic core and so on in the voltage control device. In order to obtain effective large capacity, a film capacitor, an electrolytic capacitor and so on are required. In respect to durability and downsizing, it is difficult to be adopted. Also, the ferromagnetic core is not advantageous in respect to cost, man-hours for building, and a temperature characteristic, and it is also difficult to be adopted.

SUMMARY OF THE INVENTION

The present invention therefore has its object to provide a power generating system for a vehicle which can realize stabilization of a power generation control operation.

A power generating system for a vehicle according to the present invention is equipped with a power generator, a voltage control device which controls an output voltage of the power generator, a battery which is charged by an output electric power of the power generator, and an external control device which transmits a power generation suppression signal for suppressing power generation by the power generator toward the voltage control device and which detects a state of the battery and inhibits transmission of the power generation suppression signal when quantity of this state is below a predetermined value.

Generally, when the power generation of a power generator is suppressed in case that the charging state of the battery is not good, a battery terminal voltage drops. Under this state, when noise from an electric load is overlaid on a power cable connecting the power generator and the battery, a voltage which is applied to the voltage control device is temporarily lowered from a predetermined threshold value. It is likely that a power control operation becomes unstable. However, the quantity of state (e.g., quantity of charging) of the battery is lower than a predetermined value. In case that the charging state is not good, suppression of power generation is not carried out. Therefore, an output voltage of the power generator is maintained high. It is possible to raise a power operation point of the voltage control device. Therefore, a voltage is not extremely lowered even when noise is overlaid on a voltage which is applied to the voltage control device. It becomes possible to realize stabilization of the power generation control operation.

In particular, even in case that the voltage control device is configured with a circuit which operates when it receives supply of an operation voltage from the power generator and which becomes inoperative when this operation voltage drops below a predetermined value or below, by inhibiting output of a voltage suppression signal, it is possible to maintain the output voltage of the power generator at a high level. It is thus possible to prevent this output voltage from being lowered until the voltage control device becomes inoperative due to overlay of noises.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
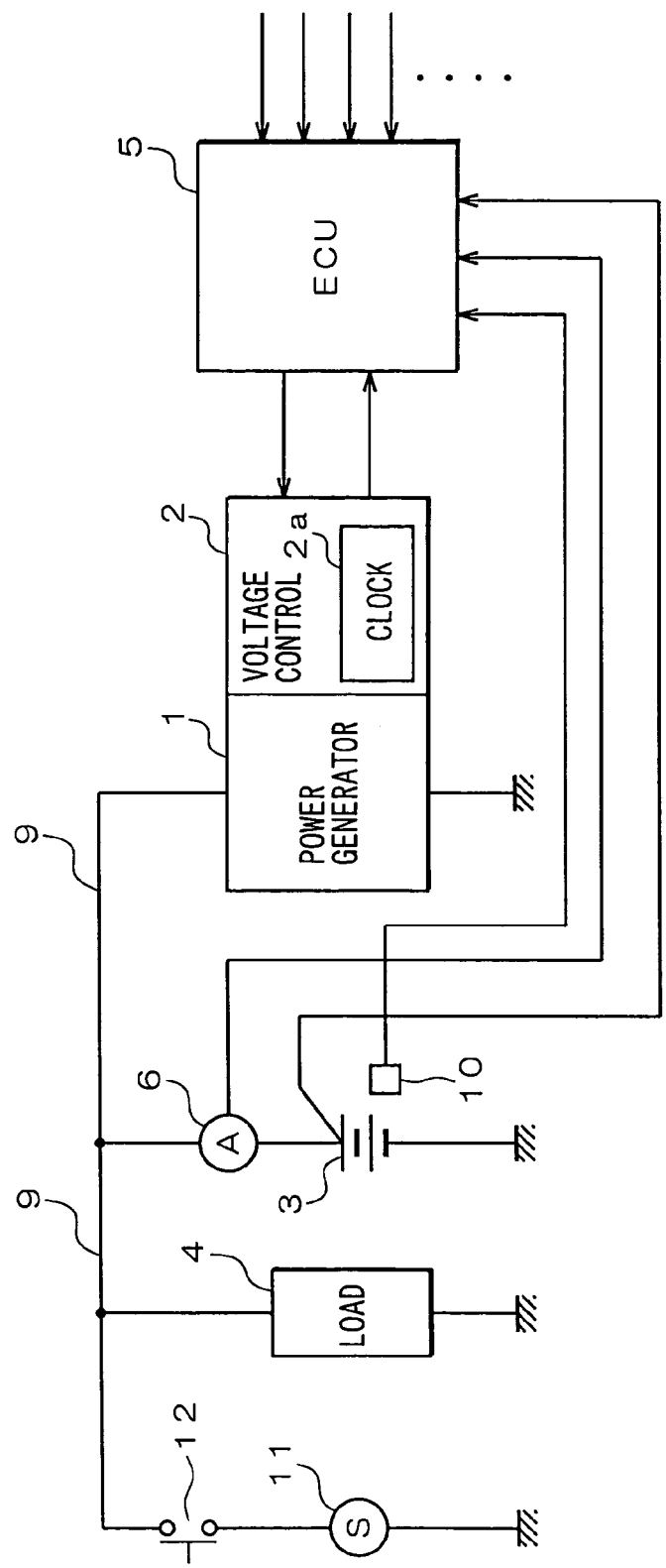
FIG. 1 is a circuit diagram showing a power generating system for a vehicle of the first embodiment of the present invention.

Referring first to FIG. 1, an electric power generating system for a vehicle is configured to have an electric power generator 1, a voltage control device 2, a battery 3, an electric load 4, and an electronic control unit (ECU) 5 for an internal combustion engine (not shown).

The power generator 1 is rotationally driven by the engine, and generates a charging electric power for the battery 3 and an operational electric power for the electric load 4.

The voltage control device 2 controls the power generator 1 to regulate an output voltage of the power generator 1 to a predetermined value by controlling a conductive state of an exciting current to a field coil in the power generator 1. In this voltage control device 2, a power supply circuit which generates operation voltages of constituent circuits, a power device such as a power transistor etc. for controlling conduction of the exciting current, a logic circuit for carrying out this conduction control and soon are realized by CMOS-IC. The voltage control device 2 incorporates circuits therein, and obtains an electric driving power for the circuits from the output of the power generator 1. The voltage control device 2 obtains an electric drive power for the circuits from the output of the power generator 1.

The circuits of the voltage control device 2 include a circuit which includes a microcomputer, or a logic circuit. The circuits of the voltage control device 2 include a clock circuit 2a which generates a clock signal with constant frequency. The circuits of the voltage control device 2 are logic circuits which are configured in such a manner that each circuit state is decided based on the clock signal from the clock circuit 2a as a standard. As to the circuits of the voltage control device 2, each circuit state is determined based on a constant frequency clock. The voltage control device 2 has a minimum voltage which is necessary for the circuits to be operated in a stable manner. When the output voltage of the power generator 1 is below the minimum voltage, in the circuits of the voltage control device 2, the operations become unstable. Therefore, it becomes impossible to detect each circuit state in a stable manner. Further, it becomes impossible to operate the circuits of the voltage control device 2 in a stable manner by maintaining the output voltage of the power generator 1 to a high level.

The electric load 4 may be an electric apparatus such as lighting device, air conditioner and so on. In recent years, these electric apparatuses are highly advanced and computerized apparatuses including electronic components for control.

The power generator 1 and the battery 3, and the battery 3 and the electric load 4 are connected by a power cable 9. The voltage control device 2 is built within the power generator 1, and necessary electric connections are made in the inside of the power generator 1.

The ECU 5 is an external control device for carrying out rotational control of the engine and power generation control of the power generator 1 based on a state of the engine, vehicle speed, rotation speed and a power generation state of the power generator 1, and so on. For example, power generation state information of the power generator 1 is sent from the voltage control device 2 to the ECU 5. Contrarily, power generation instruction information for setting the output voltage of the power generator 1 is sent from the ECU 5 to the voltage control device 2. This power generation instruction information has a function as a power generation suppression signal. By sending the power generation instruction information for setting a lower output voltage of the power generator 1 from the ECU 5 toward the voltage control device 2, it becomes possible to suppress power generation of the power generator 1.

Also, in the vicinity of one terminal (e.g., a positive terminal side) of the battery 3, a current sensor 6 as current detecting means for detecting a charging/discharging current of the battery 3 is disposed. A detection signal of this current sensor 6 and a terminal voltage of the battery 3 are inputted to the ECU 5.

The power generating system of this embodiment is designed to operate as follows, specifically to perform the operational procedures shown in FIG. 2 and other operational procedures (not shown).

Figure 3:
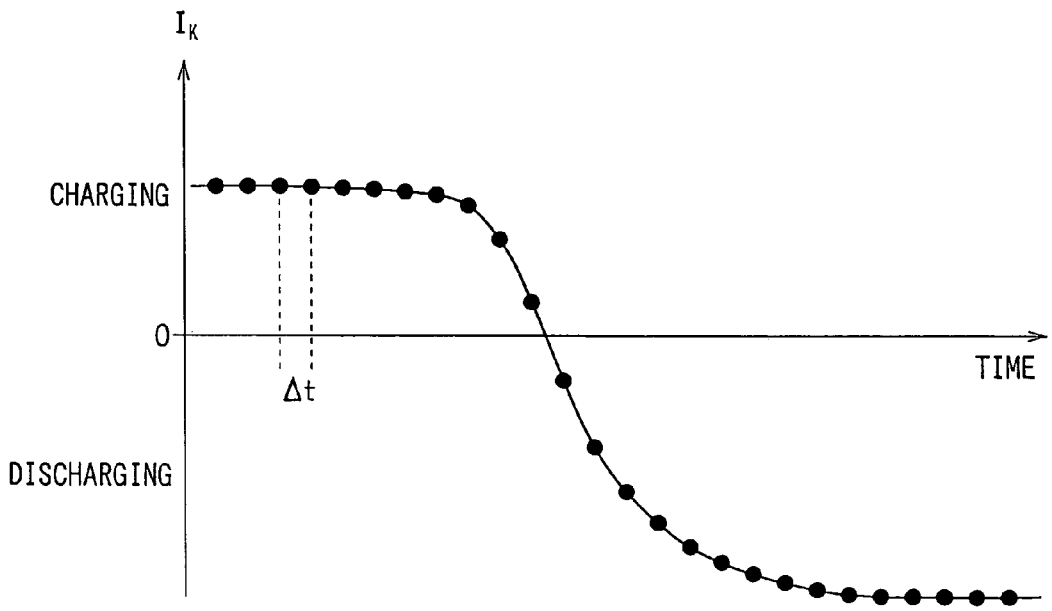
FIG. 3 is a diagram showing a sampling method of a charging/discharging current in the first embodiment.

The ECU 5 first reads therein an output value (charging/discharging current value Ik of the battery 3) of the current sensor 6 (step 100), and carries out processing for integrating this charging/discharging current value (step 101). Generally, the charging quantity as the quantity of state of the battery 3 can be represented by time-integration of the charging/discharging current value. In this embodiment, since the charging/discharging current of the battery 3 is detected by the current sensor 6, numerical integration processing is simply carried out by the ECU 5. In particular, as shown in FIG. 3, a sampling interval for taking the charging/discharging current from the current sensor 6 is assumed to be a constant interval $\Delta t$. Assuming that the read charging/discharging current is Ik, time-integration of the charging/discharging current value can be represented by $$\Sigma(Ik \times \Delta t) = \Delta t \times \Sigma Ik.$$

Therefore, by simply integrating the current value which is sampled, it becomes possible to carry out time-integration of the charging/discharging current value. A time measurement circuit such as a timer which is exclusively used for integration and so on becomes unnecessary.

Next, the ECU 5 determines charging quantity of the battery 3 by the use of a result ($\Sigma Ik$) which is integrated in the step 101 (step 102). As described above, it is possible to calculate the charging quantity of the battery 3 as a product of the integration result ($\Sigma Ik$) and the sampling interval $\Delta t$. The ECU 5 determines the charging quantity by simply calculating the product. Operations of the above steps 101 and 102 of the ECU 5 correspond to operations as battery current integrating means.

Next, the ECU 5 determines whether suppression of power generation of the power generator 1 is necessary or not (step 103). For example, in case that a vehicle with an accelerator pressed down for a vehicle acceleration and soon, it is necessary to suppress power generation of the power generator 1. In this case, an affirmative determination is made in the step 103.

Next, the ECU 5 determines whether the charging quantity of the battery 3 is below a predetermined value or not (step 104). For example, assuming that time when the battery 3 is in a full charge state is 100%, it is determined whether the charging quantity is below 80% thereof (predetermined value) or not. If the battery 3 with model number "55D23" as one example, 100% capacity of this battery is 48 Ah (Ampere hour), and the charging quantity of 80% thereof becomes 38 Ah. Therefore, in the step 104, it is determined whether the charging quantity of the battery 3 is below 38 Ah or not. In case that the battery charging quantity is not below the predetermined value, in the step 104, a negative determination is made. The ECU 5 outputs a power generation suppression signal (step 105). On the other hand, in case that the battery charging quantity is below the predetermined value, in the determination of the step 104, an affirmative determination is made.

The ECU 5 inhibits output of the power generation suppression signal (step 106). By this means, after the power generation suppression signal is outputted (step 105), or the output is inhibited (step 106), or after it is negatively determined in the step 103 since power generation suppression is unnecessary, it returns to the step 100. The operations after reading of the charging/discharging current with the predetermined sampling interval $\Delta t$ are repeated.

In this manner, in this embodiment, when the charging quantity as the quantity of state of the battery 3 falls below the predetermined value (80%, when a full charge state is assumed to be 100%), the output of the power generation suppression signal is inhibited. Therefore, in case that the output voltage of the power generator 1 will be lowered relatively rapidly if the power generation of the power generator 1 is suppressed, and the charging quantity of the battery 3 is small, suppression of power generation is inhibited.

Therefore, it becomes possible to maintain the output voltage of the power generator 1 which is applied to the voltage control device 2 at a high state, i.e., to set an operation point of the voltage control device 2 to a high level. On this account, even if noises are generated at the time of turning-on or turning-off of the electric load 4, it is possible to prevent the output voltage of the power generator 1 from being extremely lowered to such a level that a power supply circuit in the voltage control device 2 stops its operation. Thus it becomes possible to realize stabilization of power generation control.

Also, in the above embodiment, even in case that the power generation suppression control by the ECU 5 is carried out, depending upon the charging quantity of the battery 3, the output of the power generation suppression signal is inhibited. Therefore, even if the power generation operation becomes unstable in a period of power generation suppression control, it is possible to avoid such disadvantages that stability of engine rotation and riding comfort of a vehicle are aggravated, and so on.

Figure 4:
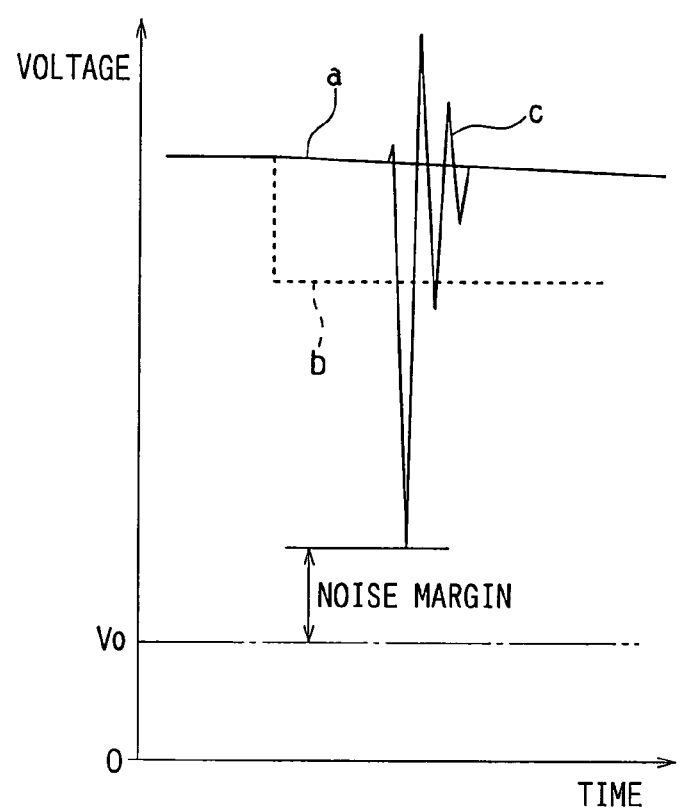
FIG. 4 is a diagram showing a change of an output voltage of a power generator in the first embodiment.
Figure 5:
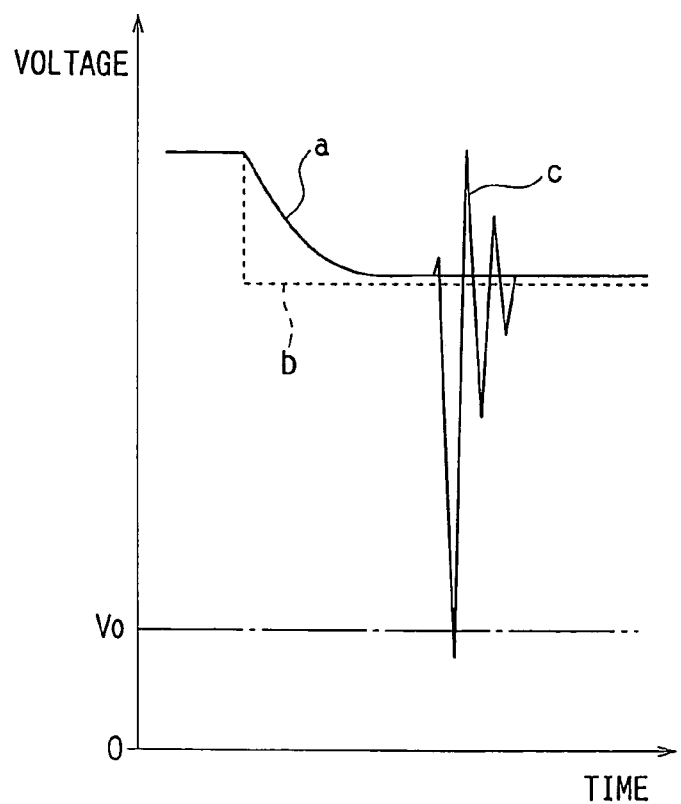
FIG. 5 is a diagram showing a change of an output voltage of a power generator in a conventional system.

FIG. 4 is a diagram showing a change of the output voltage of the power generator 1 in this embodiment. Also, FIG. 5 is a diagram showing a change of an output voltage of a power generator in a conventional structure.

In case that the charging quantity of the battery 3 is large, even if the power generation suppression signal is outputted from the ECU 5 and an regulated voltage of the power generator 1 is set to a low level by the voltage control device 2 (dotted line b in FIG. 4), the output voltage of the power generator 1 is not lowered rapidly, but is lowered gradually or only slightly (solid line a in FIG. 4). Therefore, even if noise c which intrudes from the power cable 9 is overlaid on the output voltage, its minimum value does not fall below a minimum operation voltage $V_0$ of the power supply circuit in the voltage control device 2.

On the other hand, in case that the charging quantity of the battery 3 is small, if the regulated voltage of the power generator 1 is set to a low level by the voltage control device 2 (dotted line b of FIG. 5), the output of the power generation suppression signal is not inhibited. As a result, the output voltage of the power generator 1 is lowered rapidly (solid line a in FIG. 5) in comparison to the case of FIG. 4. Therefore, when the noise c which intrudes from the power cable 9 is overlaid on the output voltage, its minimum value falls below the minimum operation voltage $V_0$ of the power supply circuit in the voltage control device 2, and the power generation control operation by the voltage control device 2 is temporarily stopped.

However, in a system structure of this embodiment, in such a case, since output of the power generation suppression signal is inhibited, the output voltage of the power generator 1 is maintained high. Even in case that noise is overlaid, it is avoided that the minimum value of the output voltage falls below the minimum operation voltage $V_0$ of the power supply circuit in the voltage control device 2.

In the above example, the quantity of charging/discharging of the battery 3 is detected by the use of a current integration method. In this method, however, only variation of the quantity of charging/discharging is checked. In order to determine absolute quantity, it is necessary to determine the initial state at the time of charging. Hereinafter, such a method that, by the ECU 5 as internal impedance detecting means, the internal impedance of the battery is measured by the use of discharging at the time of start-up, and the absolute quantity of the charging quantity of the battery 3 is measured based on this measurement result will be explained.

The ECU 5, when the starter 11 is driven, reads therein a current Is at the time of operation start-up of the starter which is measured by the current sensor 6 and a terminal voltage Vs of the battery 3, and calculates an internal impedance Z=(E−Vs)/Is. By the use of this internal impedance Z, the charging quantity (battery capacity) of the battery 3 is calculated. E which is used for calculation of the internal impedance Z is an open-circuit voltage of the battery 3.

Figure 6:
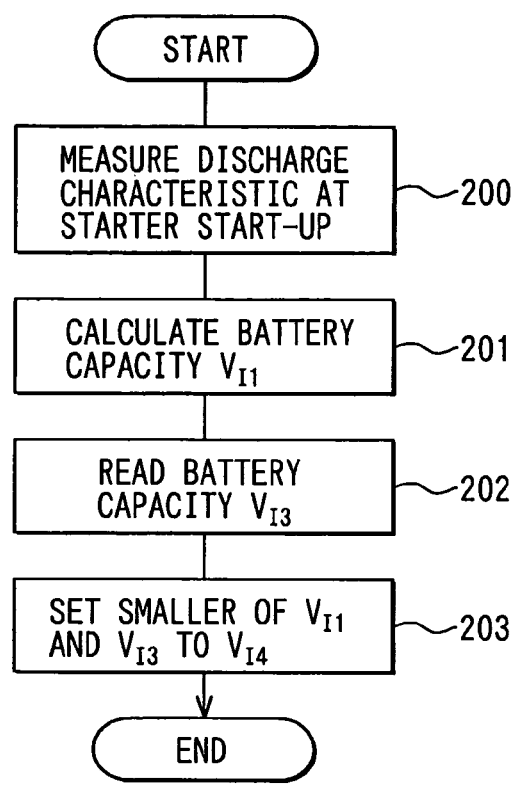
FIG. 6 is a flow chart showing operational procedures of an ECU for carrying out state detection of a battery in the first embodiment.

Next, the operation for detecting the battery capacity will be explained in detail. FIG. 6 is a flow chart showing operational procedures of the ECU 5 which carries out a battery capacity detection of the battery 3. When a starter switch 12 is turned on and the starter 11 is driven, firstly, the ECU 5 measures a discharge characteristic at the time of start-up of the starter (step 200).

Figure 7:
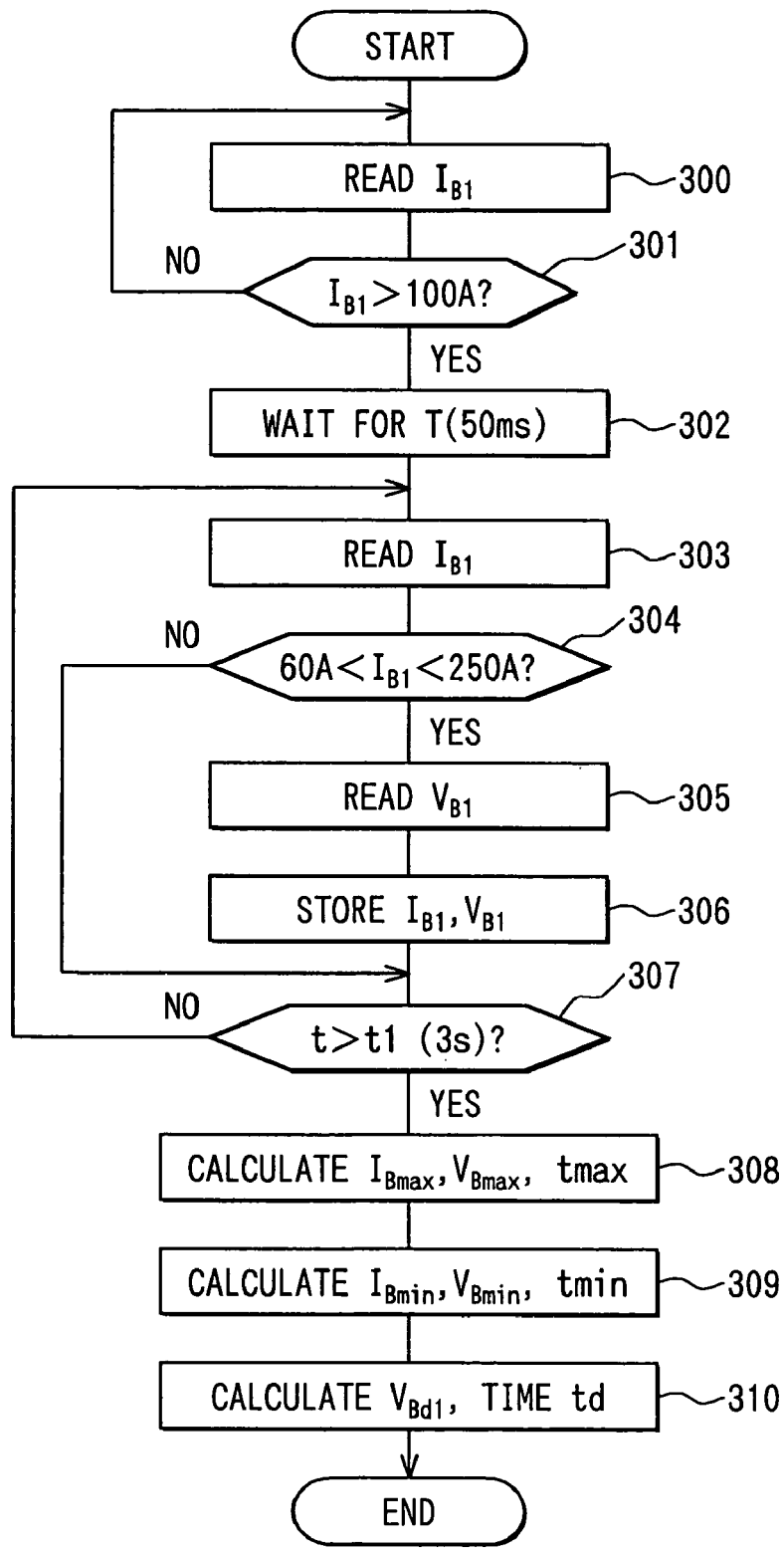
FIG. 7 is a flow chart showing detailed operational procedures of the ECU for carrying out discharge characteristic measurement at the time of starter starting-up in the first embodiment.

FIG. 7 is a flow chart showing detailed operational procedures of the ECU 5 which carries out a discharge characteristic measurement at the time of start-up of the starter in the step 200 of FIG. 6. The ECU 5 reads a discharge current $I_{B1}$ of the battery 3 which is detected by the current sensor 6 (step 300), and determines whether this discharge current $I_{B1}$ is larger than 100 A or not (step 301). This determination is for confirming start-up of the starter 11. In case that the discharge current $I_{B1}$ is 100 A or below, a negative determination is made in the determination of the step 301. Returning to the step 300, the reading operation of the discharge current $I_{B1}$ is repeated.

Also, when the discharge current $I_{B1}$ becomes larger than 100 A and an affirmative determination is made in the determination of the step 301 and the start-up of the starter 11 is confirmed, next, the ECU 5 waits for a predetermined period T (step 302). The ECU 5 then reads the discharge current $I_{B1}$ of the battery 3 which is detected by the current sensor 6 (step 303). The reason that it waits for the predetermined time in the step 302 is for avoiding an influence of noises which will be generated due to a sudden large current flow immediately after the start-up of the starter 11. After waiting for the period T of, for example, 50 ms, reading of the discharge current $I_{B1}$ is carried out.

Next, the ECU 5 determines whether the discharge current $I_{B1}$ is in a range from 60A to 250A or not (step 304). This determination is for detecting that the starter 11 is in operation. The range of the discharge current $I_{B1}$ which is used for this determination uses a value which will flow through the starter 11 when the starter 11 is in operation and an engine is not driven. It is desirable that, according to a specification etc. of the starter 11 which is used in fact, this range is changeable. In case that the starter 11 is in operation and the discharge current $I_{B1}$ is in this range, in the determination of the step 304, an affirmative determination is made. The ECU 5 then reads a terminal voltage $V_{B1}$ of the battery 3 (step 305).

Next, the ECU 5 stores the discharge current $I_{B1}$ and the terminal voltage $V_{B1}$ of the battery 3 which are read in the steps 303, 305, together with elapsed time t after the start-up of the starter (step 306). After this memory operation, the ECU 5 determines whether the elapsed time t after the start-up of the starter exceeds a predetermined time t1 (3 seconds) or not (step 307). This predetermined time t1 is set to be larger, for example, 3 seconds, considering that normally, even 1 second is not required until an engine is driven after the start-up of the starter.

In case that 3 seconds have not passed over after the start-up of the starter, in the step 307, a negative determination is made. Returning to the step 303 again, the reading operation of the discharge current $I_{B1}$ of the battery 3 and operations after that are repeated. In this manner, each operation from the step 303 to the step 307, i.e., reading of the discharge current $I_{B1}$, the terminal voltage $V_{B1}$ of the battery 3 at the time of the starter start-up is repeated at 25 ms interval. In compliance with the elapsed time t at that time, the discharge current $I_{B1}$, the terminal voltage $V_{B1}$ are stored. As to these data, always, new 10 data are memorized. Also, in case that the discharge current $I_{B1}$ of the battery 3 is below 60A and a negative determination is made in the determination of the step 304, the operation are repeated except for the reading operation of the discharge current $I_{B1}$ of the step 305 and the memory operation of the step 306.

When 3 seconds have passed over from the starter start-up, in the determination of the step 307, an affirmative determination is made. The ECU 5 calculates maximum values $I_{Bmax}$, $V_{Bmax}$ and $t_{max}$ of the discharge current $I_{B1}$, the terminal voltage $V_{B1}$ of the battery 3 and the elapsed time t which are memorized in the step 306 (step 308), and calculates minimum values $I_{Bmin}$, $V_{Bmin}$ and $t_{min}$ of these (step 309).

Next, the ECU 5 determines a characteristic relation between the discharge current $I_{B1}$ and the terminal voltage $V_{B1}$. This determination is similar to plotting the maximum values, the minimum values of the discharge current $I_{B1}$ and the terminal voltage $V_{B1}$ which are calculated in the steps 308, 309 on such a coordinate system that a horizontal axis is set as the discharge current $I_{B1}$ and a vertical axis is set as the terminal voltage $V_{B1}$, and drawing a characteristic by connecting them by a straight line. The ECU 5, based on this characteristic relation, calculates a first capacity detection voltage $V_{Bd1}$ which is the terminal voltage $V_{B1}$ when the discharge current $I_{B1}$ is 150 A, and calculates elapsed time $t_d$ from the starter start-up until detection of this voltage $V_{Bd1}$ (step 310). Calculation of this elapsed time td is carried out by averaging 10 elapsed times t which are memorized in the step 306. Also, it is not necessary that the discharge current $I_{B1}$ for determining the first capacity detection voltage $V_{Bd1}$ is limited particularly to 150 A.

Figure 8:
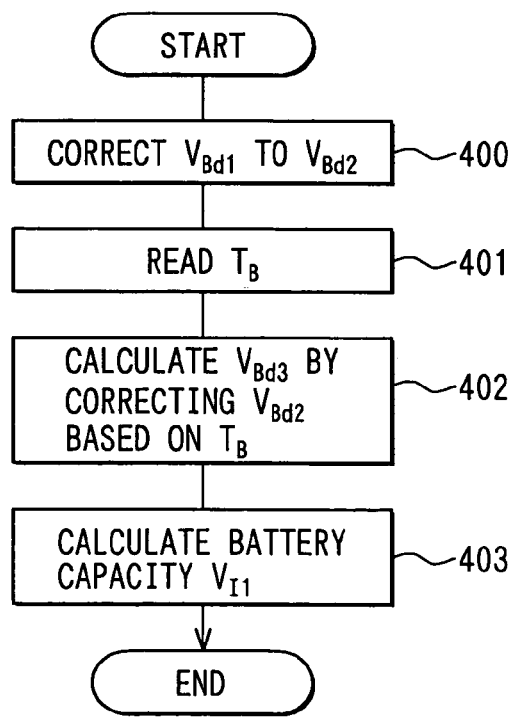
FIG. 8 is a flow chart showing operational procedures of the ECU for carrying out correction to a first capacity detection voltage in the first embodiment.

Next, an operation for carrying out correction to the first capacity detection voltage $V_{Bd1}$ which is calculated in accordance with a series of procedures shown in FIG. 7 will be explained. FIG. 8 is a flow chart showing operational procedures of the ECU 5 for carrying out correction to the first capacity detection voltage.

The terminal voltage $V_{B1}$ at the time when the battery 3 is discharged is lowered with time, and shows a stable value when approximately 5 seconds have passed over from the start of discharging. In contrast to this, the start-up of an engine due to driving of the starter 11 is carried out within power-on 1 second as described above, and a measured value of the terminal voltage of the battery 3 at the time when the starter is driven. In short, the first capacity detection voltage $V_{Bd1}$ which is measured as described above shows a higher value than a value when it is stabilized.

In this connection, the ECU 5, based on a relation of discharge time and the terminal voltage of the battery 3 which are obtained in advance, corrects the first capacity detection voltage $V_{Bd1}$ by subtracting deviation $\Delta V$ from a stable value which is obtained 5 seconds after the starter 11 is driven from the first capacity detection voltage $V_{Bd1}$ which is determined by the discharge current at the time when the starter is operating (step 400). By carrying out such a correction based on the discharge characteristic, it is possible to obtain a correct terminal voltage when the battery 3 is discharging with 150A. This is set to the second capacity detection voltage $V_{Bd2}$.

Also, since the terminal voltage $V_{B1}$ of the battery 3 has a temperature characteristic, in order to obtain a more accurate terminal voltage, it is necessary to consider an influence due to temperature. Specifically, the ECU 5 reads a battery temperature $T_B$ which is detected by a battery temperature sensor 10 (step 401). Based on this read-in battery temperature $T_B$, the second capacity detection voltage $V_{Bd2}$ is corrected (step 402). By carrying out such a correction, it is possible to obtain a more accurate terminal voltage of the battery 3, and this is set as a third capacity detection voltage $V_{Bd3}$.

Next, the ECU 5 calculates a battery capacity $V_{f1}$ at the time when the starter is operating, by the use of this third capacity detection voltage $V_{Bd3}$ (step 403).

Figure 9:
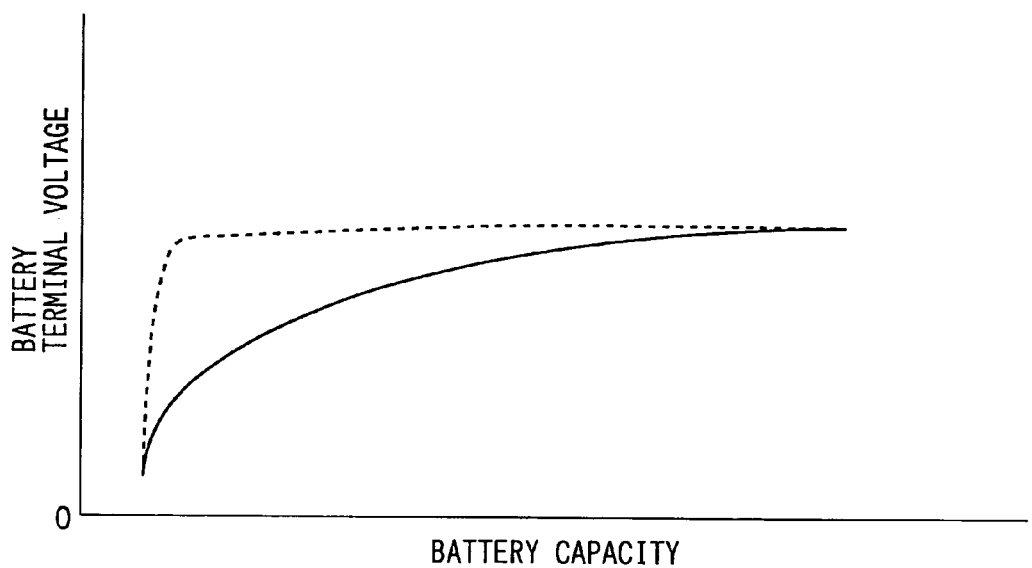
FIG. 9 is a characteristic chart showing a relation of a terminal voltage of the battery and a battery capacity in the first embodiment.

FIG. 9 is a characteristic chart showing a relation of a terminal voltage and a battery capacity of the battery 3. The characteristic shown in FIG. 9 shows a measurement result, by an experiment, of a relation of a battery terminal voltage and a battery capacity in case that, in a situation that the battery 3 is new, a predetermined constant current is discharged for a predetermined time, and there occurs no layering of battery liquid specific gravity, polarization right after charging. As shown by a solid line in FIG. 9, it is found that, when the battery capacity is small, the battery terminal voltage becomes smaller. The ECU 5 memorizes this characteristic in advance, and based on this characteristic, by the use of the third capacity detection voltage $V_{Bd3}$, capacity (first battery capacity) $V_{f1}$ of the battery 3 at the time when the starter is operating is determined (step 201 of FIG. 6).

In this manner, by the use of the characteristic chart shown in FIG. 9, it becomes possible to easily determine battery capacity based on the battery terminal voltage.

For example, considering that a previous time is a first time traveling, the ECU 5 detects the second battery capacity $V_{f2}$ at the time of traveling by integrating the charging/discharging current of the battery 3 after commencement of an engine start-up which is read from the current sensor 6. By adding this integrated value to the first battery capacity $V_{f1}$, the ECU 5 memorizes a final value of this second battery capacity $V_{f2}$ (value when traveling is completed) as a third battery capacity $V_{f3}$.

In traveling at this time, the ECU 5 reads out the third battery capacity $V_{f3}$ which is memorized when traveling at previous time is completed (step 202 of FIG. 6), and compares small and large of the fist battery capacity $V_{f1}$, which is determined in the step 201 and the third battery capacity $V_{f3}$ which is read out in the step 202. A smaller value is set as a fourth battery capacity $V_{f4}$ (step 203).

Normally, if a state of the battery 3 is good, the above first, third battery capacities $V_{f1}$, $V_{f3}$ become substantially equal. Generally, any value of these first, third battery capacities $V_{f1}$, $V_{f3}$ may be adopted. However, since the following case is encountered in a practical case, a smaller one out of the first, third battery capacities $V_{f1}$, $V_{f3}$ is adopted, and reasons thereof will be explained hereinafter.

As the first reason, considered is such a case that the fist battery capacity $V_{f1}$ is larger by a predetermined value than the third battery capacity $V_{f3}$. This is such a case that, due to layering of battery liquid specific gravity, or density of the battery liquid being raised right after charging in the vicinity of an electrode (polarization), as shown by the dotted line of FIG. 9, to a true characteristic which is shown by a solid line, the battery terminal voltage to battery capacity becomes larger. Therefore, the fist battery capacity $V_{f1}$ becomes larger than true battery capacity. On that account, in this case, it is determined that the third battery capacity $V_{f3}$ is close to the true battery capacity, and this is set as the fourth battery capacity $V_{f4}$.

Figure 10:
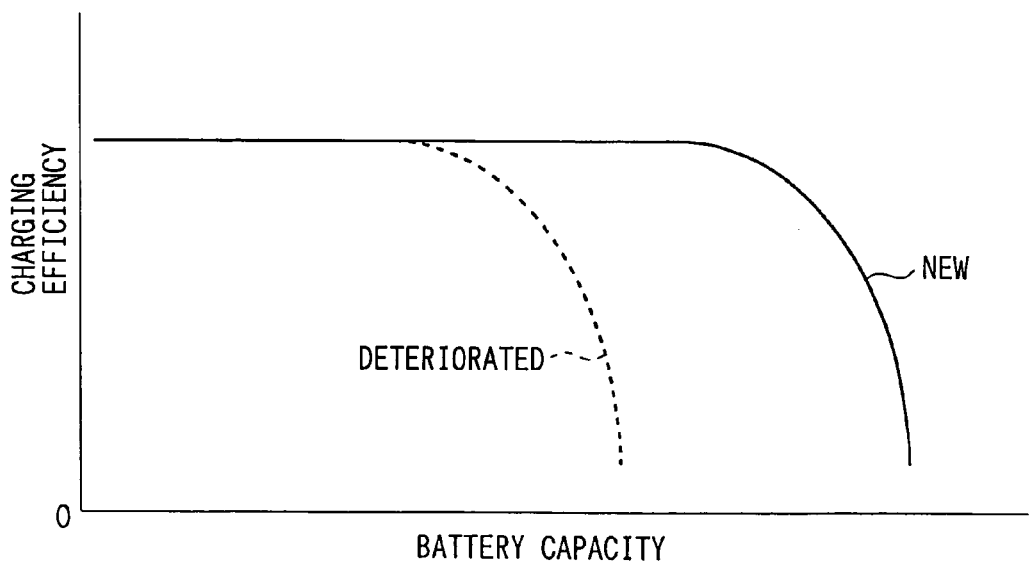
FIG. 10 is a characteristic chart showing a relation of the battery capacity and a charging efficiency in the first embodiment on the occasion that the battery is charged.

As the second reason, considered is such a case that the third battery capacity $V_{f3}$ is larger by a predetermined value than the first battery capacity $V_{f1}$. FIG. 10 is a characteristic chart showing a relation of battery capacity and charging efficiency on the occasion that the battery 3 is charged. As shown in FIG. 10, in a new battery 3, when the battery capacity is nearly 80% or below of actual capacity (capacity in 100% charged state), the charging efficiency (increasing rate of capacity to a charging current) becomes nearly 100%. When the battery capacity is nearly 80% or above of the actual capacity, as the battery capacity is increasing by charging the battery 3, a voltage of an electrode is elevated.

In case that it is elevated up to a predetermined value or above, there occurs gassing in which water in the battery liquid is electrolyzed by a charging current. Therefore, the charging efficiency is gradually lowered as the battery capacity becomes larger. This is because the third battery capacity $V_{f3}$ becomes larger than the true battery capacity, since the battery capacity becomes nearly 80% or above of the actual capacity by such a fact that the battery 3 is charged. When charging is further continued, a charging current which is used for gassing is integrated as one which is used for charging of the battery 3.

Further, in case that the battery 3 is deteriorated, as shown by a dotted line in FIG. 10, since lowering of the charging efficiency becomes fast, the third battery capacity $V_{f3}$ at the time of deterioration becomes larger than the second battery capacity $V_{f2}$ of the brand new battery. On that account, in this case, it is determined that the first battery capacity $V_{f1}$ is close to the true battery capacity. It is therefore adopted as the fourth battery capacity $V_{f4}$.

Figure 11:
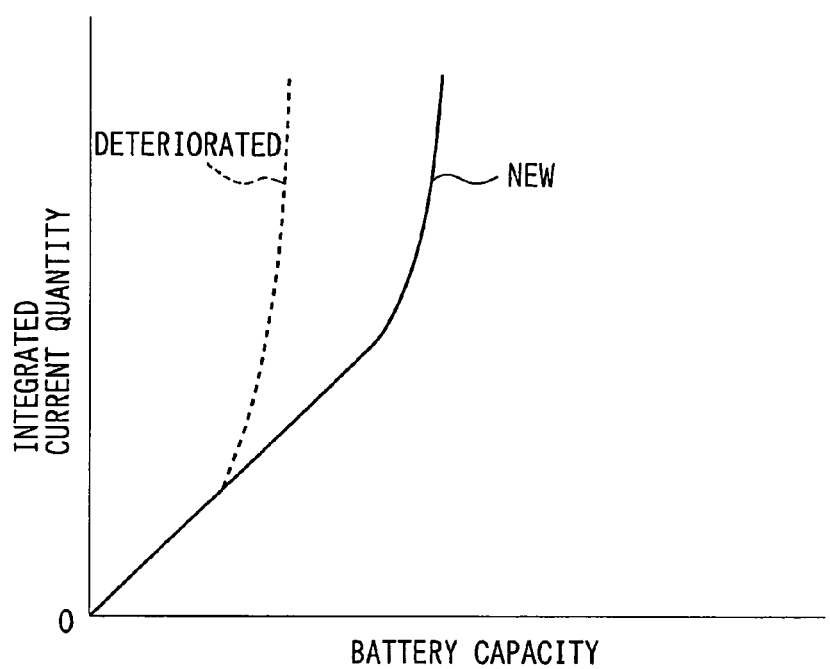
FIG. 11 is a characteristic chart showing integration quantity of a battery charging current to the battery capacity in the first embodiment on the occasion that the battery is charged.

FIG. 11 is a characteristic chart showing integration quantity of a battery charging current to battery capacity on the occasion that the battery 3 is charged. As shown by the solid line in FIG. 11, in case that a brand new battery 3 is charged, up to the extent of a certain range (such a range that the battery capacity is nearly 80% or below), in proportion to the integration quantity of a charging current, the battery capacity increases. In a range of more than that, the charging efficiency is lowered. Therefore, the battery capacity does not increase by comparison of increase of the integration quantity of the charging current. The same trend can be seen in the deteriorated battery 3. As shown by the dotted line in FIG. 11, an upper limit value of such a range that the battery capacity increases in proportion to the integration quantity of a charging current becomes lower. When it exceeds this range, the battery capacity does not increase so much.

In contrast to the above layering, in case of gassing, since air bubbles are generated from an electrode and by this air bubbles, battery liquid is scrambled up, the layering and the gassing rarely occur at the same time. Therefore, since both of the first, third battery capacities $V_{f1}$, $V_{f3}$ do not become large, by adopting a value of a smaller one as described above, it is possible to determine the correct capacity. Thus, the final battery capacity $V_{I4}$ may be used in the step 104 in place of the battery charging quantity.

Figure 12:
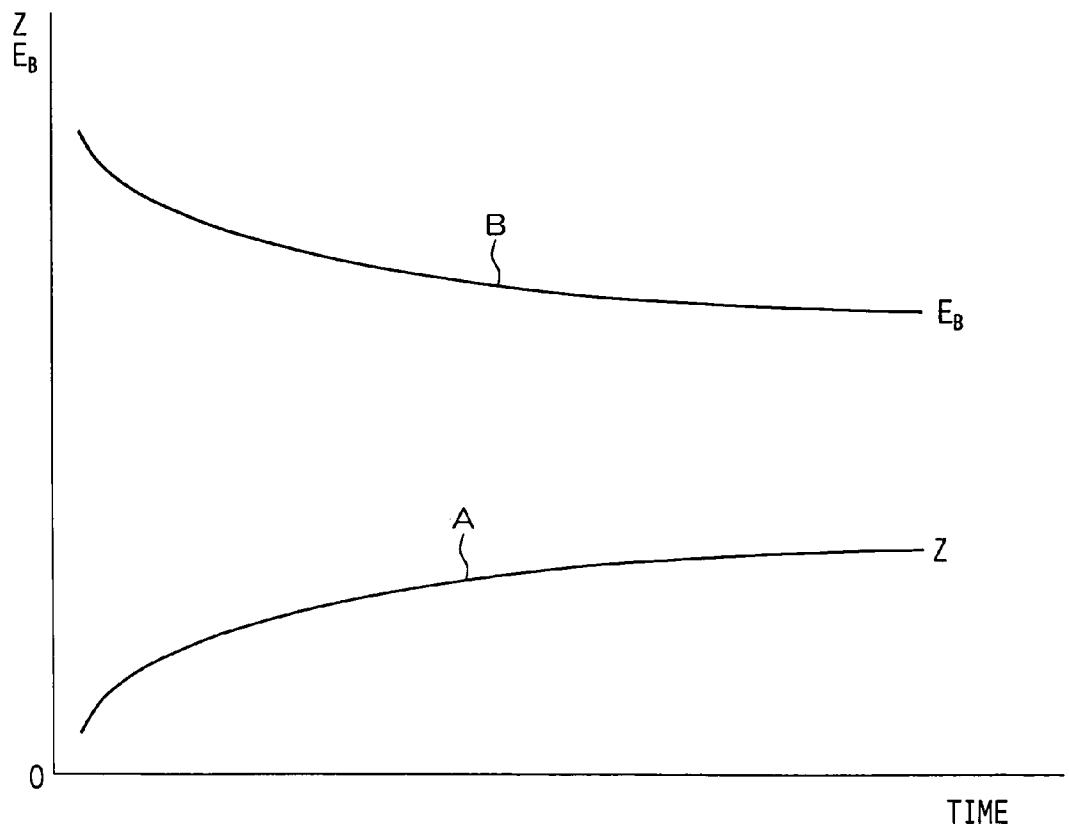
FIG. 12 is a diagram showing a change of internal impedance of the battery in the first embodiment.

FIG. 12 is a diagram showing a change of internal impedance Z of the battery 3. In FIG. 12, shown is a relation of a curve B of an open-circuit voltage $E_B$ and a curve A of the internal impedance Z of the battery 3 to passage of time T after a vehicle is stopped in a charging state. As apparent from FIG. 12, it is found that the curve B of the open-circuit voltage $E_B$ of the battery 3 is changed in the same manner as the curve A of the internal impedance Z, due to the influence of polarization. Since it is necessary to carry out a correct measurement of the internal impedance in the stabilized state, a procedure for determining whether it is stabilized or not will be hereinafter explained.

The ECU 5 detects stop of a vehicle, for example, by monitoring the current flowing from the battery 3 which is obtained by the current sensor 6. It is conceivable that, if the current is of a predetermined value or below, a vehicle is in the stop state. In case that a key switch is turned off, and a switch for flowing a current to a load which is not interlocked with the key switch is turned off, it is determined that a vehicle is in the stop state.

After the stop state of a vehicle is detected, the ECU 5 detects the open-circuit voltage $E_B$ of the battery 3, and sets this open-circuit voltage $E_B$ as a first open-circuit voltage $E_{B1}$. After a constant interval T is measured (e.g., 1 hour is measured by a timer and so on), a second open-circuit voltage $E_{B2}$ of the battery 3 is measured. At this time, the ECU 5 calculates a difference of the first open-circuit voltage $E_{B1}$ and the second open-circuit voltage $E_{B2}$, and determines whether an absolute value $|E_{B2}-E_{B1}|$ of this difference $(E_{B2}-E_{B1})$ is larger than a predetermined value $E_{Bref}$.

If this absolute value $|E_{B2}-E_{B1}|$ is larger than the predetermined value $E_{Bref}$, it is determined that it is not possible to detect a state of the battery 3 correctly since polarization remains in the battery 3, even if the internal impedance Z is measured. After that, the ECU 5, in the stop state of a vehicle, measures the open-circuit voltage $E_B$ of the battery 3 with the constant interval $\Delta T$, until the absolute value $|E_{Bn+1}-E_{Bn}|$ becomes smaller than the predetermined value $E_{Bref}$.

On the other hand, if the absolute value $|E_{Bn+1}-E_{Bn}|$ becomes smaller than the predetermined value $V_{Bref}$, influence of polarization of the battery 3 is almost eliminated. It is determined that, by measuring the internal impedance Z, it is possible to detect a state of the battery 3 correctly. The measurement of the open-circuit voltage $E_B$ of the battery 3 with the constant interval $\Delta T$ is stopped. If there is no influence of polarization of the battery 3, the measurement of the internal impedance Z is allowed. The ECU 5 memorizes the previous internal impedance Z and state of the battery 3, until it carries out detection of the internal impedance Z at next time.

Figure 13:
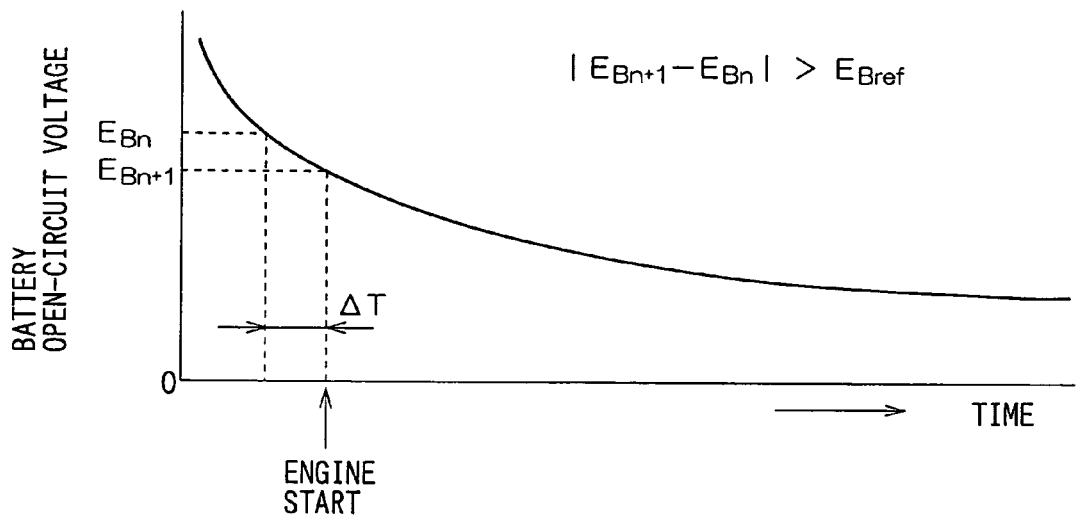
FIG. 13 is a diagram showing a change of an open-circuit voltage of the battery and a relation with detection timing of the internal impedance in the first embodiment.
Figure 14:
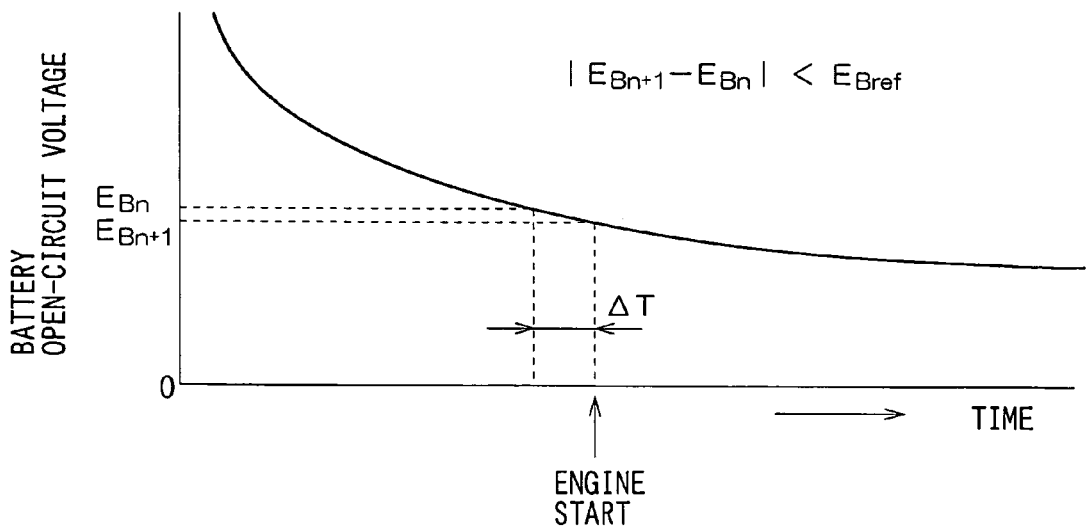
FIG. 14 is a diagram showing a change of the open-circuit voltage of the battery and a relation with detection timing of the internal impedance in the first embodiment.

FIG. 13 and FIG. 14 are diagrams showing a change of an open-circuit voltage of the battery 3 and a relation with detection timing of internal impedance Z. The ECU 5 does not carry out detection of the internal impedance Z when the starter 11 is driven in such a situation that the absolute value $|E_{Bn+1}-E_{Bn}|$ of the difference of open-circuit voltages of the battery 3 is larger than the predetermined value $E_{Bref}$ as shown in FIG. 13. On the other hand, the ECU 5 carries out detection of the internal impedance Z when the starter 11 is driven in such a situation that the absolute value $|E_{Bn+1}-E_{Bn}|$ of the difference of open-circuit voltages of the battery 3 is smaller than the predetermined value $E_{Bref}$ as shown in FIG. 14.

Second Embodiment

Since noise absorbing ability is lowered in case that the battery 3 is deteriorated, variation of the output voltage of the power generator 1 becomes larger. Also at this time, it is desirable to inhibit the output of the power generation suppression signal.

Figure 15A:
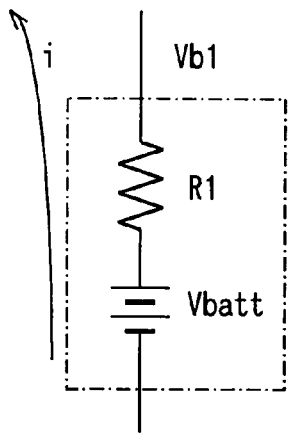
FIGS. 15A and 15B are diagrams showing changes of the battery terminal voltage due to presence or absence of deterioration of the battery in the second embodiment.
Figure 15B:
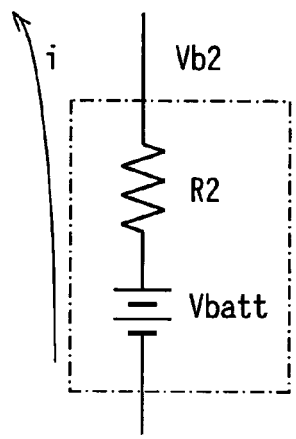

FIGS. 15A and 15B is a diagram showing changes of the battery terminal voltage due to presence or absence of deterioration of the battery 3. When the battery 3 is deteriorated, the internal impedance increases. The internal impedance of the battery 3 which is new and not deteriorated is R1 (FIG. 15A), and the internal impedance of the battery 3 which is deteriorated is R2 (FIG. 15B).

Assuming that a negative surge current which flows when the inductive electric load 4 is turned on or off is i, and an ideal terminal voltage of the battery 3 is $V_{batt}$, the battery voltage $V_{b1}$ of the battery 3 which is not deteriorated becomes $V_{batt}-i\times R1$, and the battery voltage $V_{b2}$ of the battery 3 which is deteriorated becomes $V_{batt}-i\times R2$. Comparing these voltages, since there is a relation of R1<R2, the terminal voltage $V_{b1}$ of the battery 3 which is not deteriorated becomes higher, and the terminal voltage $V_{b2}$ of the battery 3 which is deteriorated becomes lower. That is, even if turning-on and turning-off of the same electric load 4 are carried out, the output voltage of the power generator 1 in case that the battery 3 which is deteriorated is used drops down largely. Therefore, in this embodiment, in case that the battery 3 is deteriorated, the output of the power generation suppression signal by the ECU 5 is inhibited. It is prevented that a control operation of the power generation control device 2 is stopped due to large decrease of the output voltage of the power generator 1.

As for determining a level of deterioration of the battery 3, various methods were proposed in the past. For example, JP patent No. 2762442 discloses a technique for determining a level of deterioration by measuring the current value $I_B$ and the battery terminal voltage $V_B$ when the starter is driven and by measuring output impedance Z $(=(E-V_B)/I_B$, E is a battery open-circuit voltage) of the battery 3. In the structure shown in FIG. 1, since it is possible to measure both values of the current value $I_B$ and the battery terminal voltage $V_B$, the ECU 5 can obtain the output impedance Z of the battery 3 by the use of these measurement results. Based on that value, it is determined whether the battery 3 is deteriorated or not. The operation of the ECU 5 regarding this deterioration determination corresponds to an operation as deterioration detecting means. As for a technique for determining a level of deterioration of the battery 3, a method other than this may be used.

Figure 2:
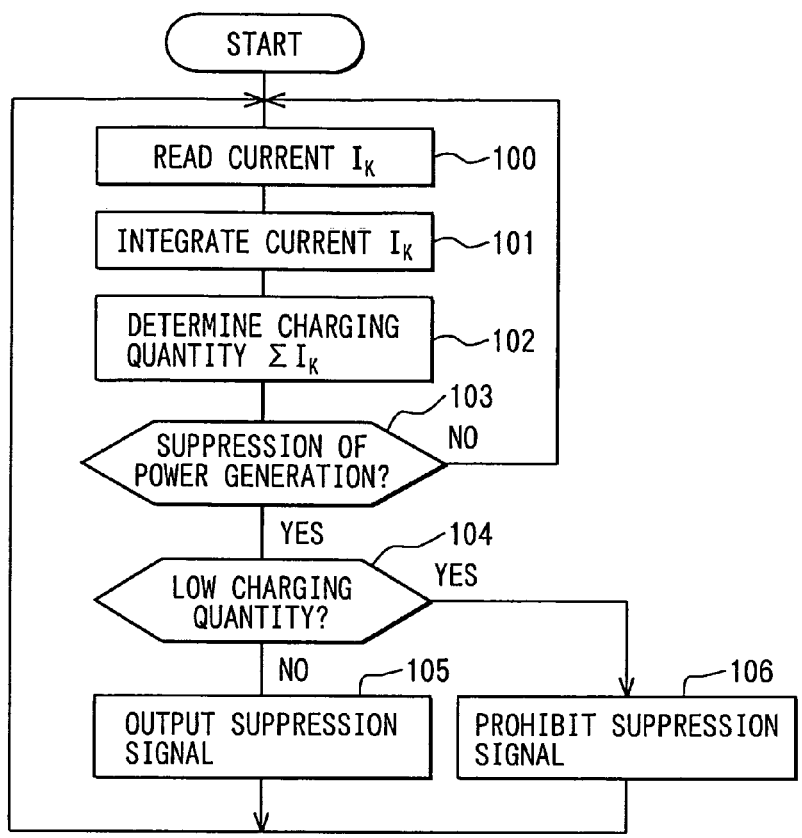
FIG. 2 is a flow chart showing operational procedures of ECU in the first embodiment.
Figure 16:
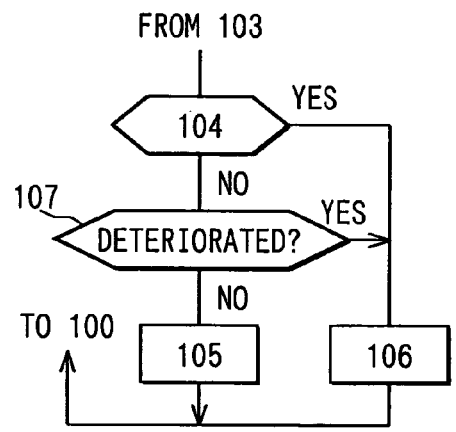
FIG. 16 is a flow chart showing operational procedures of ECU in the second embodiment.

Operational procedures of the ECU 5 in this embodiment are substantially the same as the operational procedures shown in FIG. 2. Between the step 104 and the step 105, an operation of the step 107 for determining whether the battery 3 is deteriorated or not may be added as shown in FIG. 16. That is, in case that the battery 3 is not deteriorated, after a negative determination is made in the determination of the step 107, the power generation suppression signal is outputted (step 105). On the other hand, in case that the battery 3 is deteriorated, after an affirmative determination is made in the determination of the step 107, the output of the power generation suppression signal is inhibited (step 106).

Figure 17:
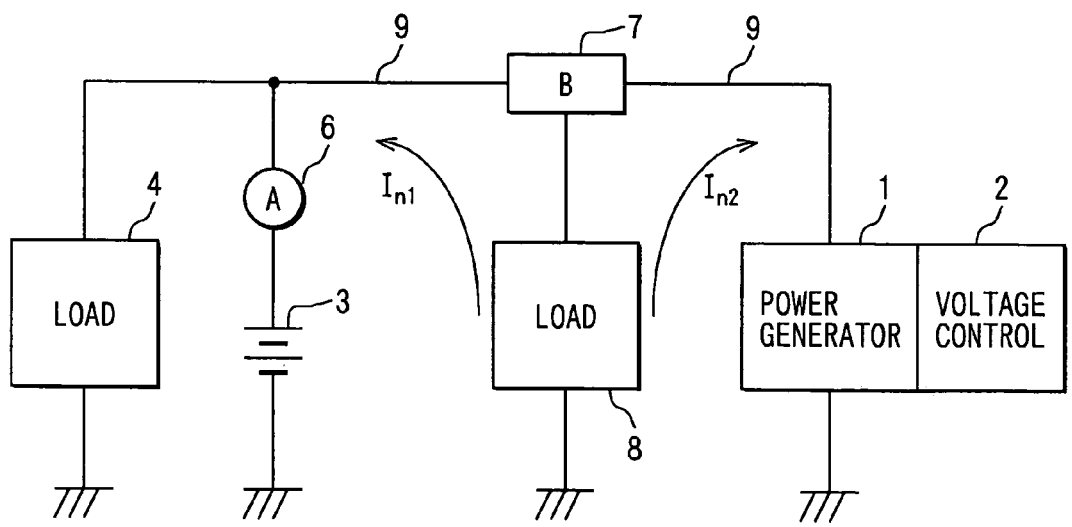
FIG. 17 is a diagram showing a power generating system for a vehicle as a modification of the embodiments in which a connection of an electric load is modified.

The present invention is not limited to the above embodiments, and various modifications are possible within a scope of the present invention. For example, in the above embodiments, the electric load 4 is connected to the battery 3. However, as shown in FIG. 17, an electric load 8 may be connected to midway of the power cable 9 for connecting the power generator 1 and the battery 3. In the structure shown in FIG. 17, in a junction box 7 as branching means (or branching may be carried out in a fuse box etc.), the power cable 9 is branched and the electric load 8 is connected.

In case that the electric load 8 is connected to the midway of the power cable 9 for connecting the power generator 1 and the battery 3, a noise current $I_{n2}$ flowing into the power generator 1 becomes larger than a noise current $I_{n1}$ flowing into the battery 3 at the time of turning-on or turning-off of the electric load 8. Therefore, it is likely that the output voltage of the power generator 1 is lowered at the time of noise generation and a control operation of the voltage control device 2 is stopped.

By combining such a structure and the inhibiting operation of output of the power generation suppression signal which is carried out in the first embodiment or the second embodiment, an advantage for realizing stabilization of power generation control by the voltage control device 2 becomes marked. Also, in case that an inductive electric load 8 is used, noises to be generated become larger. Therefore, it becomes possible to further raise the advantage of realizing stabilization of power generation control.

What is claimed is:

1. A power generating system for a vehicle comprising:
   a power generator;
   a voltage control device which controls an output voltage of the power generator;
   a battery which is charged by an output electric power of the power generator; and
   an external control device which outputs a power generation suppression signal toward the voltage control device, when the vehicle is in a predetermined condition, to suppress power generation by the power generator,
   wherein the external control device detects a state of the battery and inhibits an output of the power generation suppression signal irrespective of the predetermined condition when quantity of the detected state is below a predetermined value.

2. The power generating system for a vehicle as in claim 1,
   wherein the external control device detects an internal impedance of the battery at the time of start-up of a starter, and detects an initial state of the battery based on the internal impedance of the battery.

3. The power generating system for a vehicle as in claim 2,
   wherein the external control device detects an open-circuit voltage of the battery at a predetermined time interval, and carries out a detecting operation of the internal impedance when a quantity of variation over time of this open-circuit voltage is a predetermined value or below.

4. The power generating system for a vehicle as in claim 1, further comprising:
   current detecting means for detecting a charging/discharging current of the battery,
   wherein the quantity of state is a battery capacity of the battery, and
   wherein the external control device detects the battery capacity based on a terminal voltage of the battery when a discharging current of the battery detected by the current detecting means is of a predetermined value.

5. The power generating system for a vehicle as in claim 4,
   wherein the external control device corrects the battery capacity based on a discharge characteristic of the battery.

6. The power generating system for a vehicle as in claim 4, further comprising:
   a temperature sensor for detecting a temperature of the battery,
   wherein the external control device corrects the battery capacity based on the detected temperature of the battery.

7. The power generating system for a vehicle as in claim 4,
   wherein the external control device integrates a detected charging/discharging current of the battery, and compares a battery capacity obtained in accordance with a start-up time of a starter at this time and the battery capacity which is obtained by adding integrated value of the charging/discharging current which is integrated at a previous vehicle traveling time to a battery capacity which is obtained in accordance with a previous start-up time of the starter, and sets a smaller value as an initial capacity for a vehicle traveling at this time.

8. The power generating system for a vehicle as in claim 1,
   wherein the voltage control device has a load responsive control function, and operates by receiving voltage from the power generator and which inhibits an operation when the operating voltage decreases to a predetermined value.

9. The power generating system for a vehicle as in claim 1, further comprising:
   a junction connected to a power cable that connects the power generator and the battery; and
   an inductive electric load connected to the power cable through the junction.

10. The power generating system for a vehicle as in claim 1,
    wherein the external control device is an engine control device for controlling a rotational state of an engine, and transmits the power generation suppression signal in accordance with a loaded state of the engine.

11. The power generating system for a vehicle as in claim 1,
    wherein the external control device detects a deteriorated state of the battery, and
    the external control device inhibits transmission of the power generation suppression signal when deterioration of the battery is detected.

12. The power generating system for a vehicle as in claim 1,
    wherein the voltage control device includes a circuit which regulates the output voltage of the power generator, the state of the circuit being determined based on a clock signal of a constant frequency.

13. A power generating system for a vehicle comprising:
    a power generator;
    a voltage control device which controls an output voltage of the power generator;
    a battery which is charged by an output electric power of the power generator; and
    an external control device which outputs a power generation suppression signal toward the voltage control device, when the vehicle is in a predetermined condition, thereby to suppress power generation by the power generator, wherein the external control device detects a state of the battery and inhibits an output of the power generation suppression signal irrespective of the predetermined condition when quantity of the detected state is below a predetermined value, and the external control device integrates a detected charging/discharging current of the battery, and compares a battery capacity obtained in accordance with a start-up time of a starter at this time and the battery capacity which is obtained by adding an integrated value of the charging/discharging current which is integrated at a previous vehicle traveling time to a battery capacity which is obtained in accordance with a previous start-up time of the starter, and sets a smaller value as an initial capacity for a vehicle traveling at this time.

* * * * *